(12) United States Patent
Naidj (10) Patent No.: US 6,627,284 B1
(45) Date of Patent: Sep. 30, 2003

(54) RAISED ADHESIVE DECORATIVE WALL AND CEILING DEVICE

(76) Inventor: Sonia Naidj, 639 S. Burlingame Ave., Los Angeles, CA (US) 90049-4827

( * ) Notice: Subject to any disclaimer, the term of this patent is extended or adjusted under 35 U.S.C. 154(b) by 0 days.

(21) Appl. No.: 09/710,931

(22) Filed: Nov. 13, 2000

(51) Int. Cl.[7] .................................................. B32B 3/14
(52) U.S. Cl. ........................ 428/40.1; 40/594; 428/41.6; 428/41.8; 428/42.1; 428/42.2; 428/42.3; 428/43; 428/94; 428/317.5; 428/904.4
(58) Field of Search ................................ 428/40.1, 41.6, 428/41.8, 42.1, 42.2, 42.3, 43, 317.5, 94, 13, 904.4; 40/594

(56) References Cited

U.S. PATENT DOCUMENTS

| 4,039,709 A | * | 8/1977 | Newman .................... 429/159 |
| 4,143,496 A | | 3/1979 | Destito |
| 4,584,218 A | | 4/1986 | Travis |
| 4,900,604 A | | 2/1990 | Martinez et al. |
| 5,457,923 A | | 10/1995 | Logan et al. |
| 5,491,006 A | | 2/1996 | Johnson et al. |
| 5,496,512 A | | 3/1996 | Logan |
| 5,523,129 A | | 6/1996 | McGeehan-Hatch |
| 5,565,252 A | | 10/1996 | Finestone et al. |
| 5,665,458 A | | 9/1997 | Mahn, Jr. |
| 5,752,356 A | | 5/1998 | Miklavic |

FOREIGN PATENT DOCUMENTS

DE     2644090     *  4/1977

* cited by examiner

Primary Examiner—Nasser Ahmad
(74) Attorney, Agent, or Firm—Michael I Kroll (57) ABSTRACT

The present invention 10 discloses a decorative wall 14 and ceiling device comprising a decorative base member 22, a peal-away back layer 38 and an adhesive layer 36. The decorative base member has embodiments comprising a flat surface embodiment 22, a flat surface embodiment having attachable pieces 24 and an embroidered embodiment 16 which utilizes a cut-out portion 42 as a part of the design. The body of the decorative member 22 may comprise cross-linked polyethylene foam 34 with a thin membrane film 38 being the peel-off backing. The present invention 10 can be cut and sized into a variety of shapes which can be used in combination 44 with each other.

1 Claim, 15 Drawing Sheets

RAISED ADHESIVE DECORATIVE WALL AND CEILING DEVICE

BACKGROUND OF THE INVENTION

1. Field of the Invention

The present invention relates generally to a decorative wall and ceiling device and, more specifically, to wall decorations such as borders, motifs and medallions that are cost effective to manufacture and are adhesively mountable. The present decorative wall device and ceiling consists of a decorative member, a peel away laminated backing member, and an adhesive bonding element. The decorative member may be furnished in a plurality of embodiments. The decorative member may consist of a flat surface embodiment, a flat surface embodiment having selectively attached raised accessments and an embroidered embodiment. The decorative member is an ornamentally designed structure that may vary in shape, size and design with multiple layers due to the individual user's preference. The decorative member material is composed of a lightweight flexible material such as cross-linked polyethylene foam. Also the decorative member is a double-sided structure that may have a highly detailed ornamental designed surface on its front side, and an adhesive element on the opposing side allowing for an easy peel and stick manner mounting. The decorative member provides means for economically adding architectural relief to a room or structure. The flat surface embodiment provides the user of the decorative wall and ceiling device with the means of a smooth finished seal that may be used to selectively attach smaller intricate pieces that work in conjunction with the flat surface embodiment to produce a user's selectively chosen raised surface design. The embroidered embodiment may consist of a selectively chosen interwoven pattern. The peel away laminated backing member is a thin membrane film that provides protection for the adhesive bonding element while the decorative wall and ceiling device is not attached to a wall or other type surfaces. Also the peel away laminated member is consistent in its shape to the decorative member that it provides protection for. The adhesive bonding element is a glue-based material that provides fastening means for said decorative wall and ceiling device. Also the adhesive bonding element may be comprised of a highly durable adhesive compound providing means for selectively rearranging the position and/or location of the decorative wall and ceiling device. The decorative wall device provides the means for the individual user to selectively design an interior and/or exterior wall area while avoiding the high cost of wood, plaster and metal. Also the decorative wall and ceiling device provides for fast and easy application of raised relief mimicking real plaster yet costing less. The decorative wall and ceiling device consists of a plurality of diverse shapes and sizes providing the means for panoramic ensemble of combinations.

2. Description of the Prior Art

There are other decoration device designed for wall decorating. Typical of these is U.S. Pat. No. 4,143,496 issued to Destito Mar. 13, 1979.

Another patent was issued to Travis on Apr. 22, 1986 as U.S. Pat. No. 4,584,218 . Yet another U.S. Pat. No. 4,900,604 was issued to Martinez et al. on Feb. 13, 1990 and still yet another was issued on Oct. 17, 1995 to Logan et al. as U.S. Pat. No. 5,457,923.

Another patent was issued to et al. on Feb. 13, 1996 as U.S. Pat. No. 5,491,006. Yet another U.S. Pat. No. 5,496,512 was issued to Logan on Mar. 5, 1996. Another was issued to McGeehan-Hatch on Jun. 4, 1996 as U.S. Pat. No. 5,523,129 and still yet another was issued on Oct. 15, 1996 to Finestone et al. as U.S. Pat. No. 5,523,252. Yet another U.S. Pat. No. 5,665,458 was issued to Mahn, Jr. on Sep. 9, 1997. Another was issued to Miklavic et al. on May 19, 1998 as U.S. Pat. No. 5,752,356.

A flat rectangular holding frame member is provided on one side with adhesive tape adjacent the edge thereof, which is covered by a peel-off film which, upon removal, allows the frame to be applied to the surface of a wall for adherence thereto; and on the other side, is provided with snap fastener means for removably holding a flat, domino decoration-bearing rectangular face member at which is similar in size and shape to that of the frame member, having mating snap fastener means on the back thereof, in place thereon, so that a wall decorated with a plurality of different domino spots, or blanks, can be rearranged on the frame member at will without removing the frame members from the wall surface.

A wall ornament for a shower and tub enclosures comprises a full scale drawing, print or photograph of a male or female or other print of interest, color imprinted upon a sheet of moisture impervious synthetic paper including a film of polypropylene and is die cut closely around is periphery. A layer of pressure sensitive adhesive is bonded to and secured over the rear of the sheet for snug and supportive engagement with the wall of a shower or tub enclosure.

A versatile decorated system is provided with self-adherent, pre-cut decorative appliques that removably attach onto substrate sheets adhered to walls. Both the appliques and the substrate sheet utilize a reusable, non-permanent adhesive coating. Such a coating permits rearrangement of the appliques on the substrate sheets and rearrangement of the substrate sheets on the walls, in a peel-off/press-on manner. Each applique provides decorative imagery of a common theme. Additionally, the substrate sheets may include decorative imagery which cooperates with the appliques to create a decorative wall scene. The appliques can also be adhered to surfaces other than the substrate sheets. The decorative presented by the wall decorating system is easily changed by repositioning the appliques or by removing appliques of one theme and substituting therefor appliques of a new theme.

A decorative molding for a corner formed by a ceiling and a vertical wall comprises a thin strip of flexible plastic and is secured to the wall by an attachment allowing the molding strip along its upper and lower edges to be flexible to conform with uneven surfaces in the ceiling and/or wall. In another form, a wall track and clip arrangement is utilized to provide easy removal from the wall for paint or wallpaper application. A corner element is provided in one form in which ends of the strips are adhesively secured thereto in overlapping engagement. In another embodiment, the strips are telescopically connected to the corner element.

A wall ornament releasably mountable is provided with reusable adhesive. A light-weight, rigid substrate is used that is thick and conveys a three-dimension impression when the wall ornament is attached to a wall or similar planar surface. Various wall ornaments can be used together cooperatively to create a decorative wall scene. The wall ornament is easily removed and the adhesive can be reused so that unlimited theme decors can be accomplished. Possibilities for wall designs include educational, fantasy, seasonal, sporting, and religious. When removed, the wall ornaments do not mar or damage wall surfaces. The wall ornaments can be professionally prepared or kits can be provided so individuals may match room decor to wall ornament.

A decorative molding for a corner formed by a ceiling and a vertical wall comprises a thin strip of flexible plastic and is secured to the wall by an attachment allowing the molding strip along its upper and lower edges to be flexible to conform with uneven surfaces in the ceiling and/or wall. In another form, a wall track and clip arrangement is utilized to provide easy removal from the wall for paint or wallpaper application. A corner element is provided in one form in which ends of the strips are adhesively secured thereto in overlapping engagement. In another embodiment, the strips are telescopically connected to the corner element.

A wall decorating system, comprising a multiplicity of multi-layer imitated window scenery sets. Each imitated window scenery set further comprising a large background scene-scape, a large foreground scene-scape, several small foreground scene-scape, and a large imitate window frame. The large background scene-scape is painted with a background scene which is unique for the each set, the large foreground scene-scape has an outline of and is painted with a particular foreground scene, the small foreground scene-scape also have outlines of and are painted with particular small foreground objects, and the large imitated window frame has a central opening surrounded by a circumferential border painted with a unique window frame structure. The imitated window scenery set may be held together and to an interior wall of a child's room by pressure sensitive adhesive and/or filamentary hook and loop type fasteners to create various imitated windows, where the frame and scenery view of the imitated windows can be interchanged as desired.

A facing wallboard such as sheet rock, adapted to reinforce the board as well as to enhance its thermal barrier and acoustic characteristics. The facing is a laminated sheeting formed by a paper ply cold-laminated to a synthetic plastic oriented film ply, the opposing surfaces of the film ply being corona-discharge treated to render the receptive to adhesives. The exposed surface of the film ply is coated with a water moist enable adhesive, so that when this coating is moistened, the facing may then be adhered to the wall board to reinforce the board and to impart sound absorbing and decorative properties thereto. The film ply or the paper ply in the facing is metalized to reflect infrared rays and thereby reduce the transfer of thermal energy through the board.

A heat activated applique is formed by forming a heat-activated laminate. The heat activated laminate includes, for example, a thermoplastic layer bonded to an indicia-bearing layer such as a pigmented polymeric film or twill. This indicia-bearing layer is bonded to a support layer by a pressure sensitive adhesive. The pressure sensitive adhesive has a preferential adhesion to the support layer. The applique is formed by cutting through the heat activated laminate but not through the support layer to thereby form the desired ornamental applique. Waste portions are separated while the applique itself remains attached the support layer bonded by pressure sensitive adhesive. This is then bonded to a substrate while still attached to the support layer by applying heat and pressure through the support layer against the heat activated applique and against a cloth substrate. This allows creation of very unique heat activated appliques and also provides for application of these appliques to a substrate with all the individual elements of the appliques properly aligned, even if those elements are not physically connected to each other.

A detachable wall trim having an elongated section of decorative wall trim a coextending recess channel on the back face. Two or more spaced fastener clips are received in the channel. These clips are formed of one-piece plates having spaced screws for holding them or securing them within the channel on the back face of the trim. A key-hole shaped screw head retaining slot is provided in each of these plates and each key-hole slot has a screw head access opening with a narrower screw shaft slot extending therefrom for slidably receiving a screw shaft without permitting passage of the screw head through the screw shaft slot. The wall screws are first fastened to the wall and properly aligned with the clips and the screw heads extending from the wall are permitted to sufficiently extend from the wall so that they pass through the key hole slots to retain the trim on the wall where desired. These clips are adapted for 360-degree orientation within the channels so that the detachable trim may be applied at any desired orientation on a ceiling or wall.

While these wall decorations may be suitable for the purposes for which they were designed, they would not be as suitable for the purposes of the present invention, as hereinafter described.

SUMMARY OF THE PRESENT INVENTION

The present invention discloses a decorative wall and ceiling device comprising a decorative base member, a peel-away back layer and an adhesive layer. The decorative base member has embodiments comprising a flat surface embodiment, a flat surface embodiment having attachable pieces and an embroidered embodiment which utilizes a cut-out portion as a part of the design. The body of the decorative member may comprise cross-linked polyethylene foam with a thin membrane film being the peel-off backing. The present invention can be cut and sized into a variety of shapes which can be used in combination with each other.

The present invention overcomes the shortcomings of the prior art by providing a decorative wall and ceiling device that may be an extruded structure as to provide a raised finish when applied to a wall surface.

The primary object of the present invention is to provide a decorative wall and ceiling that may be self adhesive, multi layer light weight and inexpensive.

Another object of the present invention is to provide a decorative wall mounted device that may not require professional labor in order to be applied to a wall, ceiling or wall type surface.

Yet another object of the present invention is to provide a decorative wall mounted device that may be painted in order to match its surrounding environment.

Still another object of the present invention is to provide an architectural relief or design that may be used in combination with wallpaper or any existing wall finish.

Still yet another object of the present invention is to provide a decorative wall and ceiling mounted device that may be environmentally sound.

Another object of the present invention is to provide more options to choose from, mix and match, and suite to individual tastes and designs, which over comes the limitations that presently exist in using paper boarders, plaster and stencils.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

LIST OF REFERENCE NUMERALS

With regard to reference numerals used, the following numbering is used throughout the drawings.
10 present invention
12 individual
14 wall
16 embroidered design
18 bottom section
20 wallpaper design
22 flat surface design
24 flat surface design with attachable pieces
26 attachable pieces
28 headboard design
30 bed
32 recess design
34 foam
36 adhesive layer
38 peel-off backing
40 layered design
42 cut-out portions
44 combination

DESCRIPTION OF THE PREFERRED EMBODIMENT(S)

In order that the invention may be more fully understood, it will now be described, by way of example, with reference to the accompanying drawings in which FIGS. 1 through 15 illustrate the present invention being a raised adhesive decorative wall and ceiling device.

Figure 1:
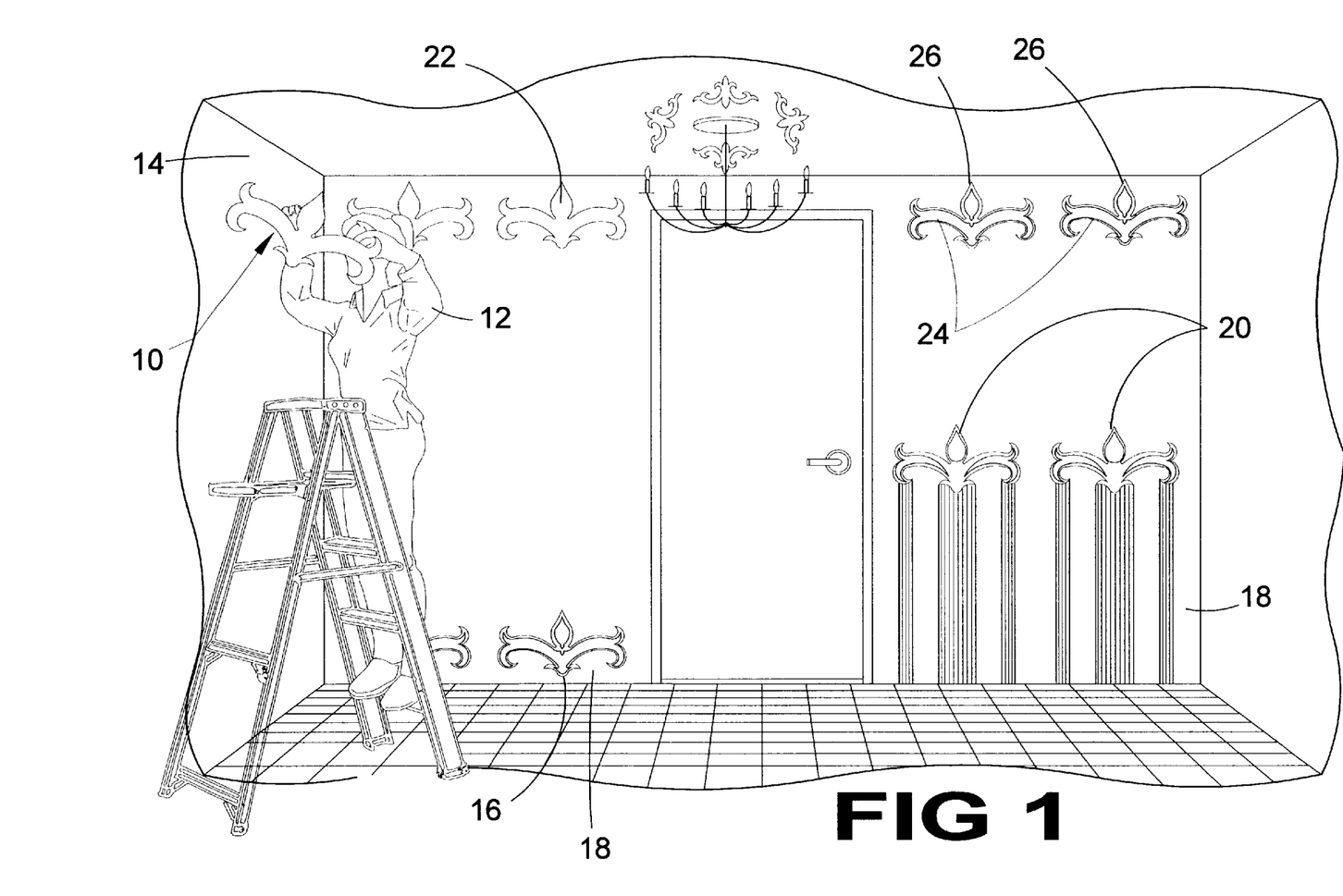
FIG. 1 is an illustrative view of the present invention in use.

FIG. 1 is a perspective view of the present invention 10. Shown is an individual 12 applying the decorative wall and ceiling device 10 to a plurality of walls 14. Also shown are a plurality of the decorative wall and ceiling devices as they are attached and mounted to a wall. Shown also is the spatial arrangement of a particular pattern in application of the decorative wall devices. Also shown is the over all view of the procedure followed when applying said decorative wall and ceiling devices 10 to a wall 14 of choice. Shown also is a plurality of various shaped decorative wall and ceiling device. Shown also is the embroidered design or embodiment 16 as it flanks the bottom section 18 of the wall. Also shown is the layer design or the wallpaper design or embodiment as it flanks the lower portion 18 of the wall. Shown also is the flat surface design or embodiment 22 without the raised embodiment pieces and the flat surface design 24 with extra attachable pieces 26. All of the designs may be used in combination.

Figure 2:
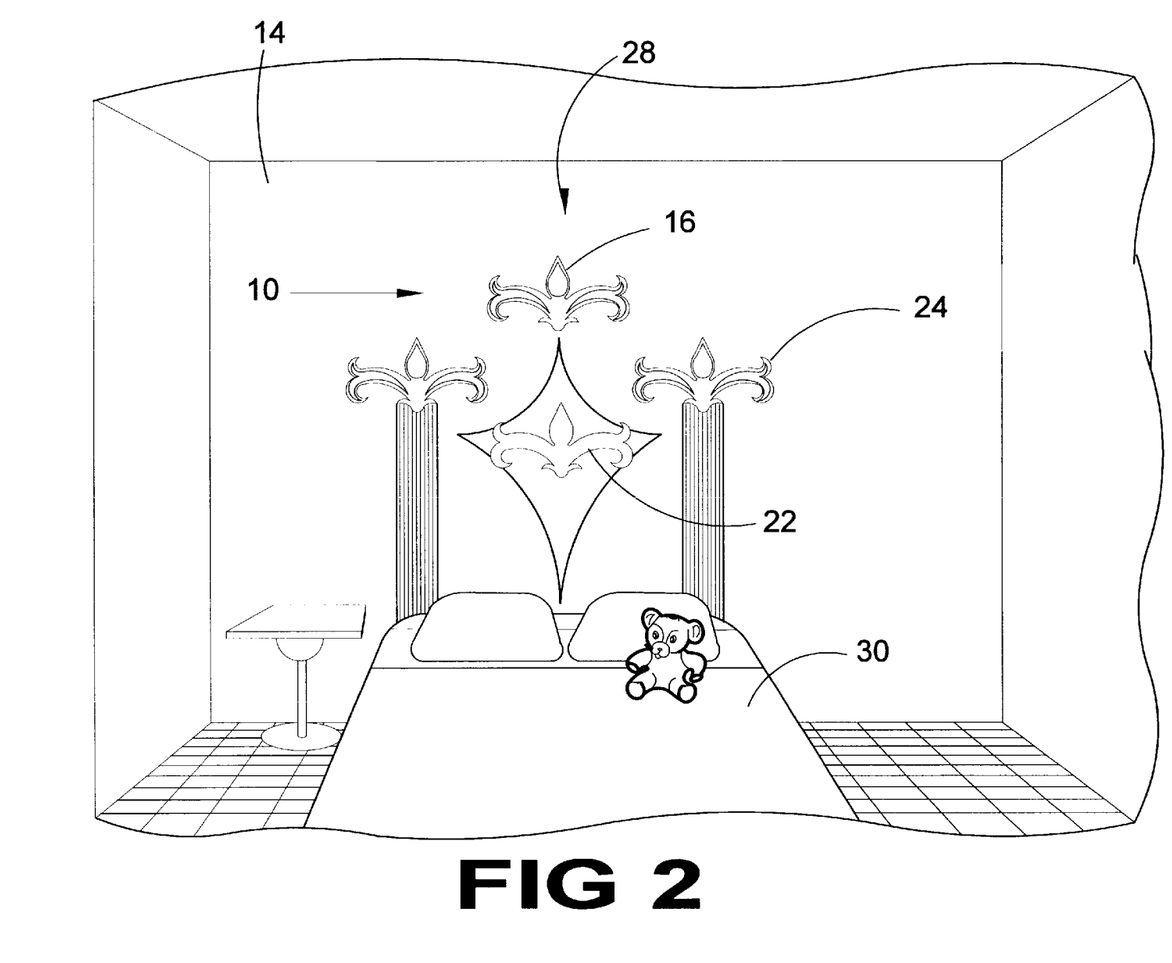
FIG. 2 is an illustrative view of the present invention showing additional uses of the present invention.

Turning to FIG. 2, shown therein is a perspective view showing a furnished bedroom having a plurality of decorative wall and ceiling devices 10 selectively attached to its walls 14. Also shown are several of the alternate embodiments that the decorative wall and ceiling device may be fashioned in. Shown also is the embroidery design 16, the raised design 24 which created a three-dimensional effect and the flat design 22 being three of the various types of embodiments that the decorative wall and ceiling device may be fashioned into. Also shown is a headboard design 28 being placed at the head of a bed 30.

Figure 3:
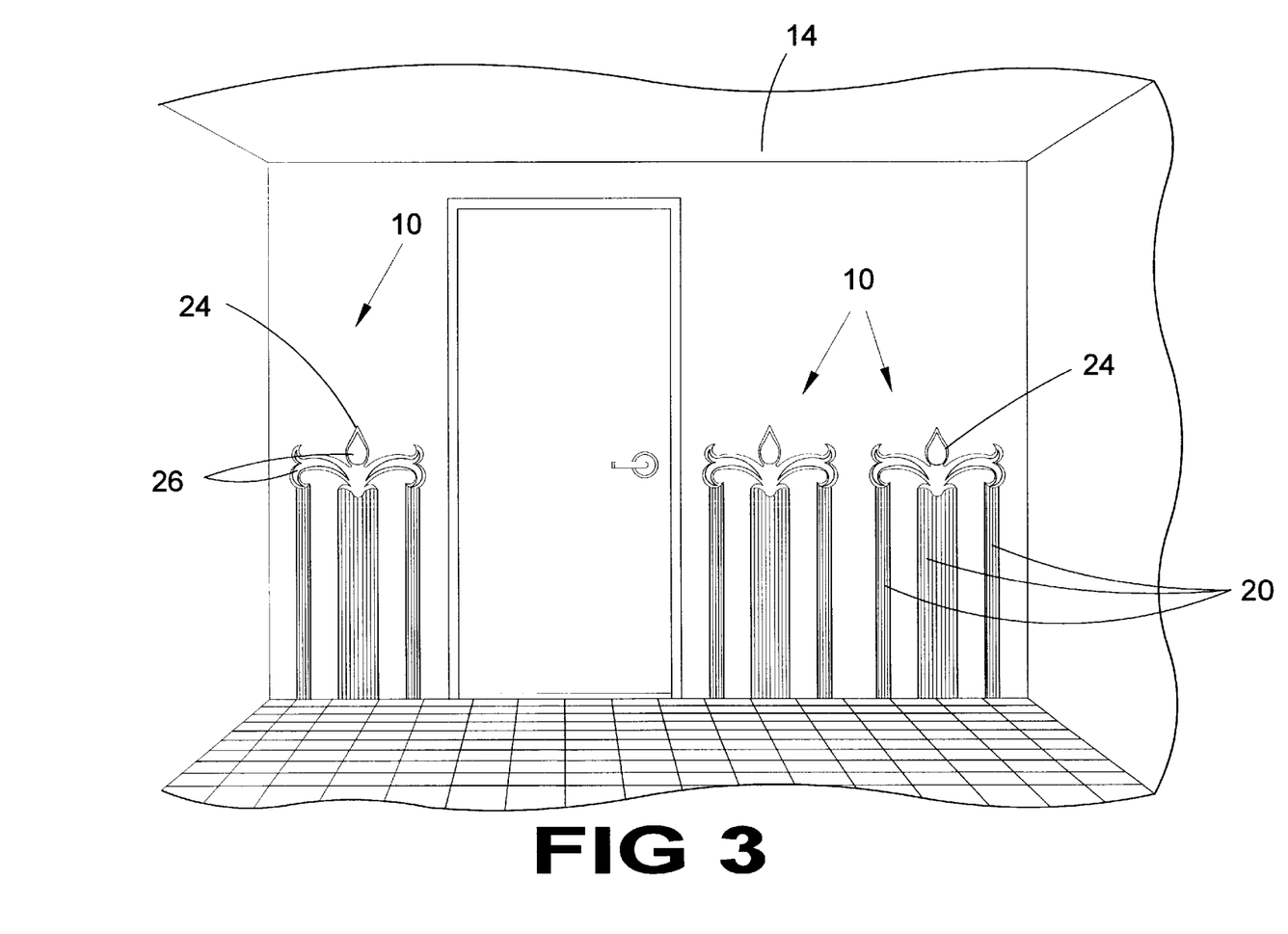
FIG. 3 is an illustrative view of the present invention showing additional uses of the present invention.

Turning to FIG. 3, shown therein is a perspective view showing a room having a plurality of decorative wall and ceiling devices 10 selectively attached to its walls 14. Also shown are several of the alternate embodiments that the decorative wall and ceiling device may be fashioned in. Shown also is the wallpaper design 20, the raised design 24 and the flat surface design 22 with attachable pieces 26 being three of the various types of embodiments that the decorative wall and ceiling device may be fashioned into.

Figure 4:
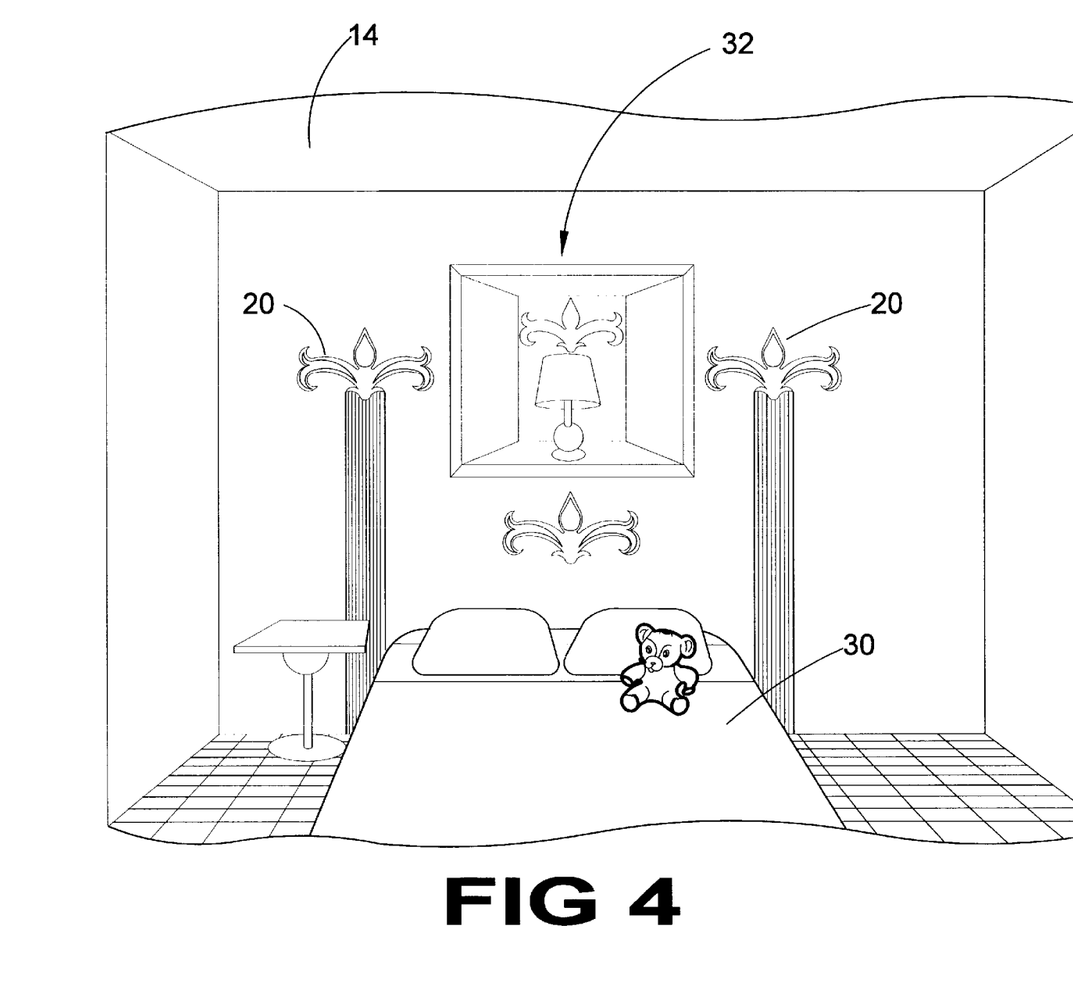
FIG. 4 is an illustrative view of the present invention showing additional uses of the present invention.

Turning to FIG. 4, shown therein is a perspective view showing a furnished bedroom having a plurality of decorative wall and ceiling devices selectively attached to its walls 14. Also shown are several of the alternate embodiments that the decorative wall and ceiling device may be fashioned in. Shown also is the recess design 32 and the wallpaper design 20 being two of the embodiment that the decorative wall and ceiling device may be fashioned into. The recess design 32 is placed in the headboard position on bed 30 and provides a three-dimensional effect.

Figure 5:
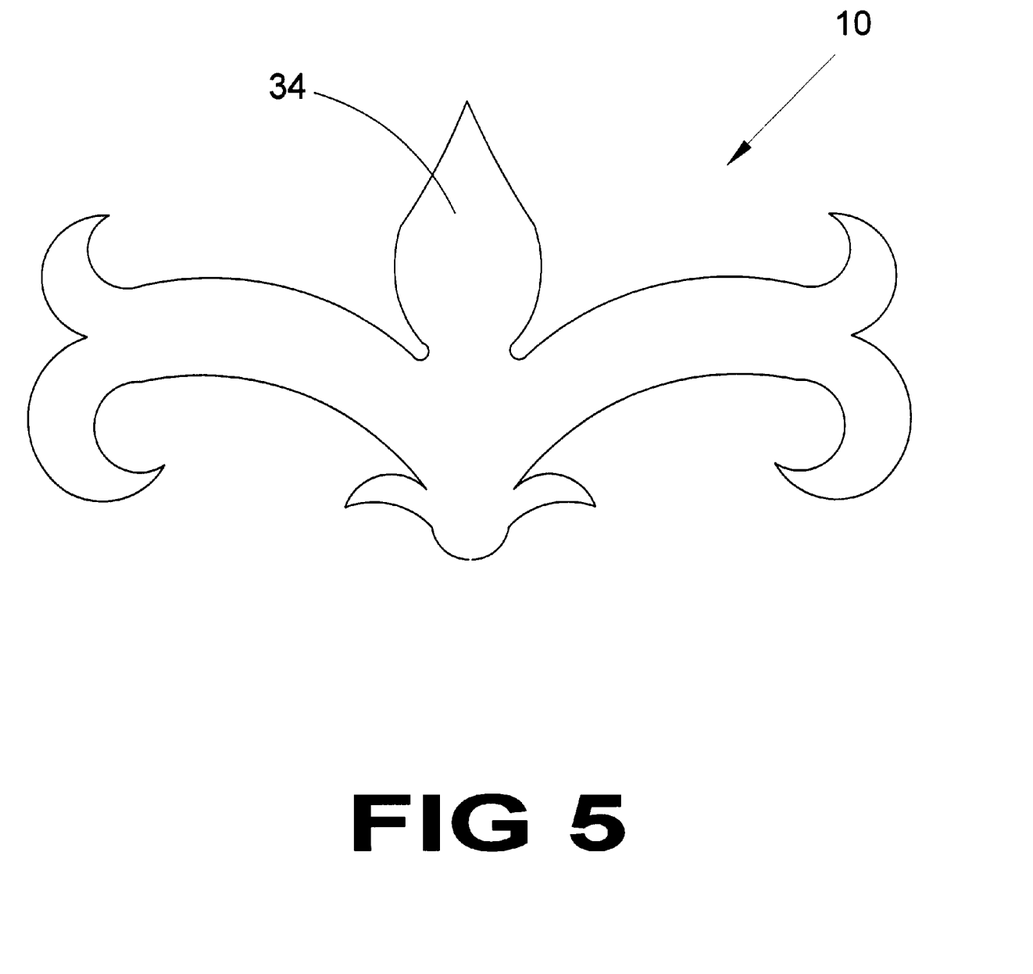
FIG. 5 is a front view of the present invention.

Turning to FIG. 5, shown therein is a front view showing a particular shape and design structure of an individual decorative wall device 10. Also shown is the cross-linked polyethylene foam 34 of the invention. The present invention 10 can be cut into various shapes, designs, sizes and thicknesses.

Figure 6:
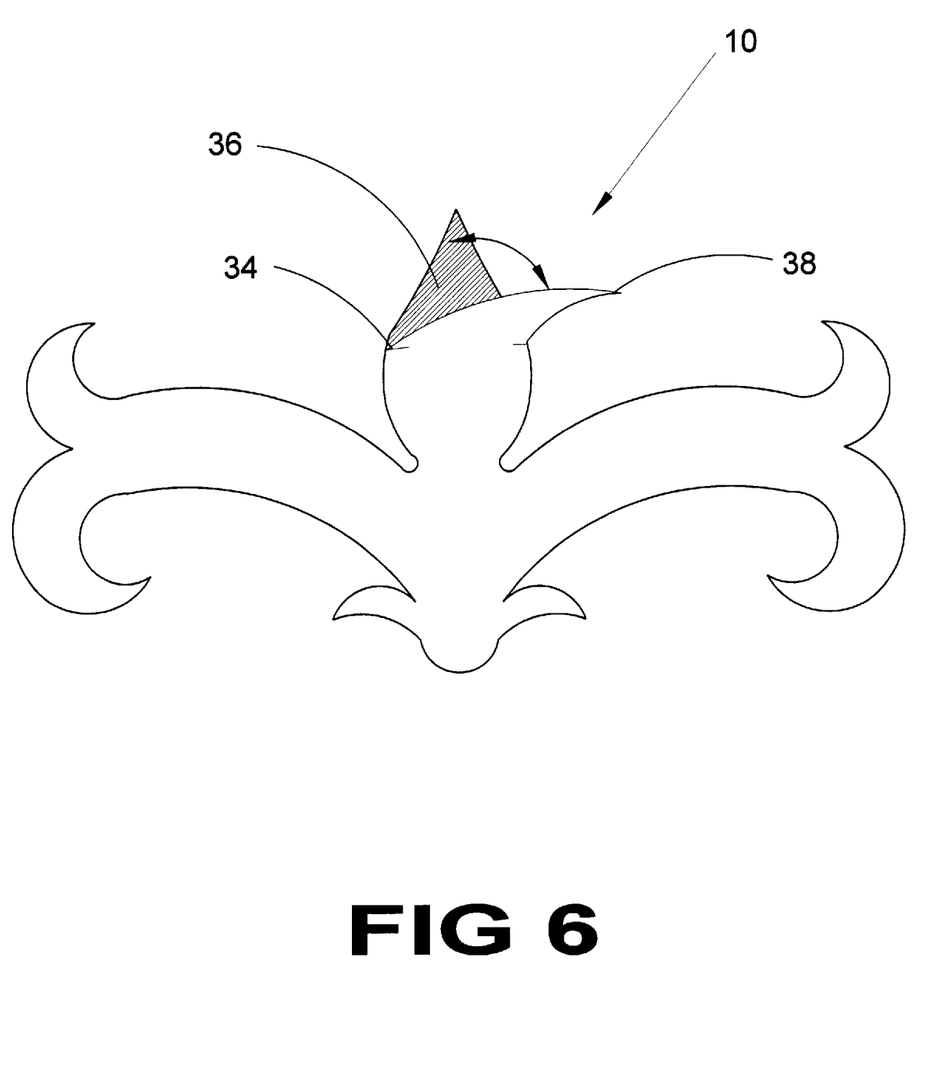
FIG. 6 is a back view of the present invention.

Turning to FIG. 6, shown therein is a back view showing the back side of the decorative wall device 10. Also shown is the functional relation between the adhesive bonding element 36 and the peel-away laminated backing member 38. The cross-linked polyethylene foam 34 is also shown with the adhesive layer 36 on the back side thereof. The peel-off layer 38 is removed during the application of the present invention 10.

Figure 7:
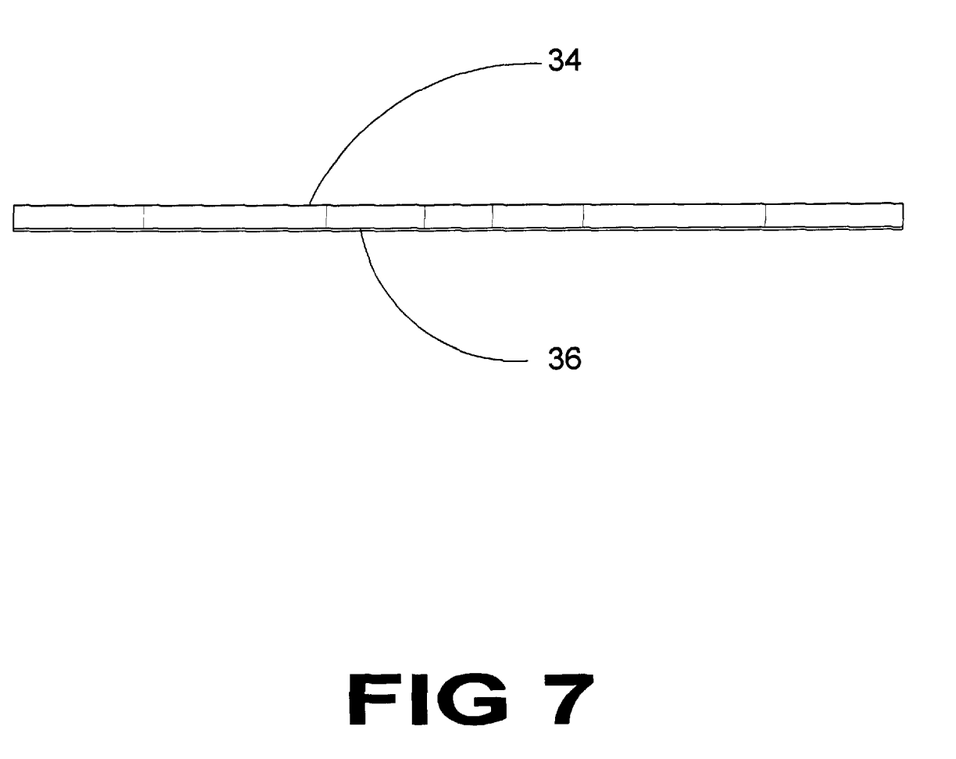
FIG. 7 is a side view of the present invention, taken from FIG. 6 as indicated.

Turning to FIG. 7, shown therein is a side view showing the decorative member comprised of cross-linked polyethylene foam 34 and the double-back adhesive bonding element 36.

Figure 8:
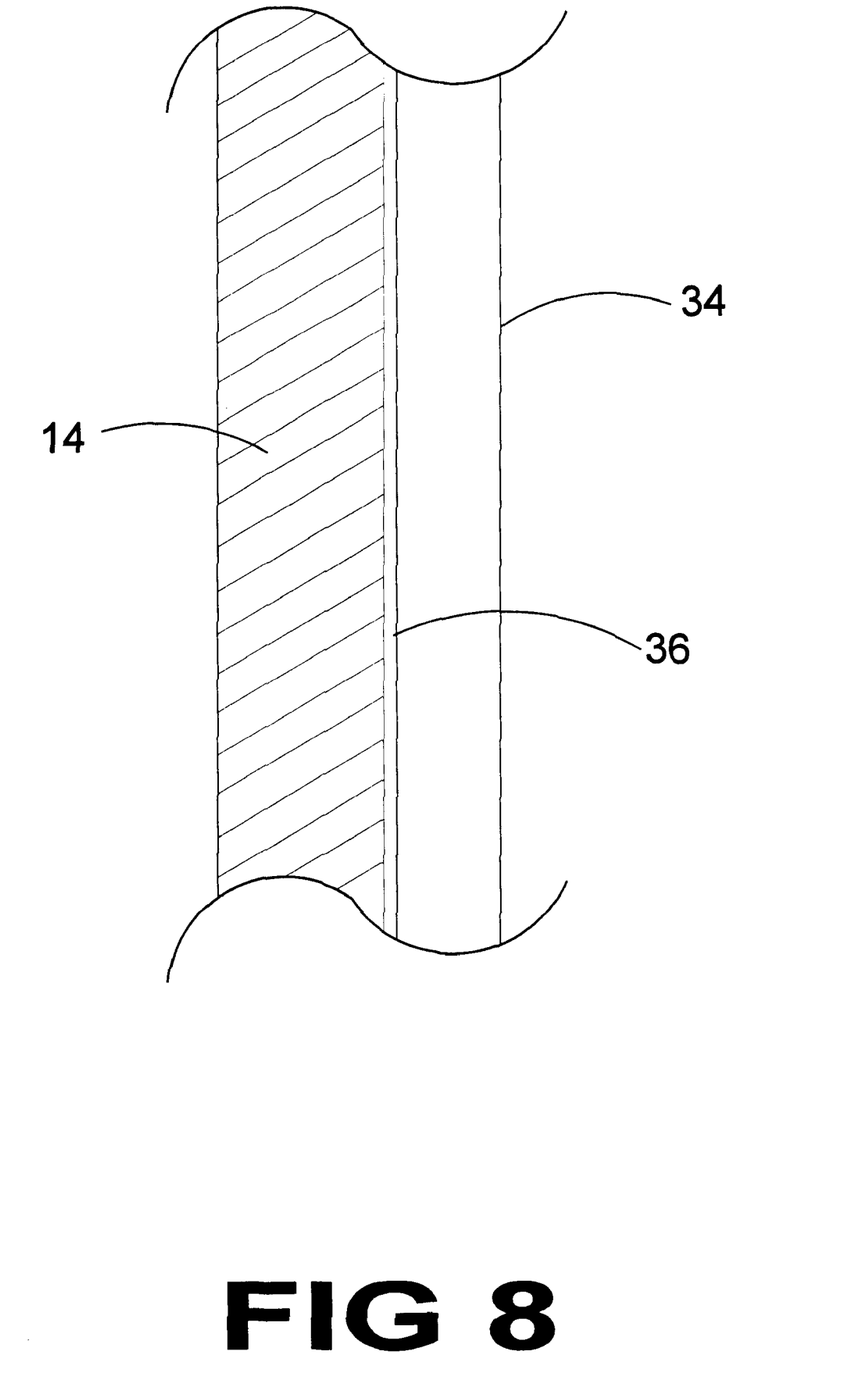
FIG. 8 is a sectional view of the present invention removably attached to a planar surface.

Turning to FIG. 8, shown therein is a sectional view showing the decorative wall device as it adheres to a wall 14. Shown are the foam layer 34 and the adhesive layer 36.

Figure 9:
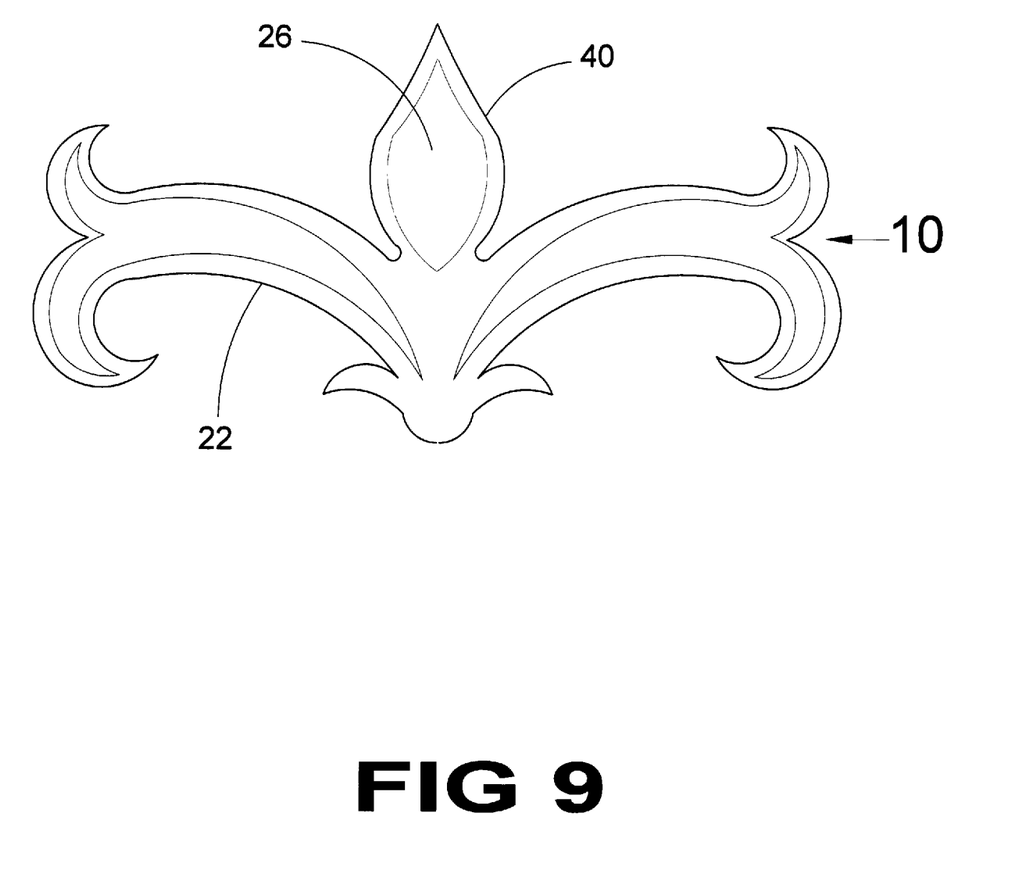
FIG. 9 is a front view of the present invention having an additional element in the form of additional shapes removably attached to the planar exterior surface.

Turning to FIG. 9, shown therein is a front view showing an alternate embodiment having a decorative design thereon. Shown also is the alternate embodiment of the decorative wall and ceiling device having a raised surface 36 thereon being attached to the bottom, or base, on flat design 22 to yield a layered design 40.

Figure 10:
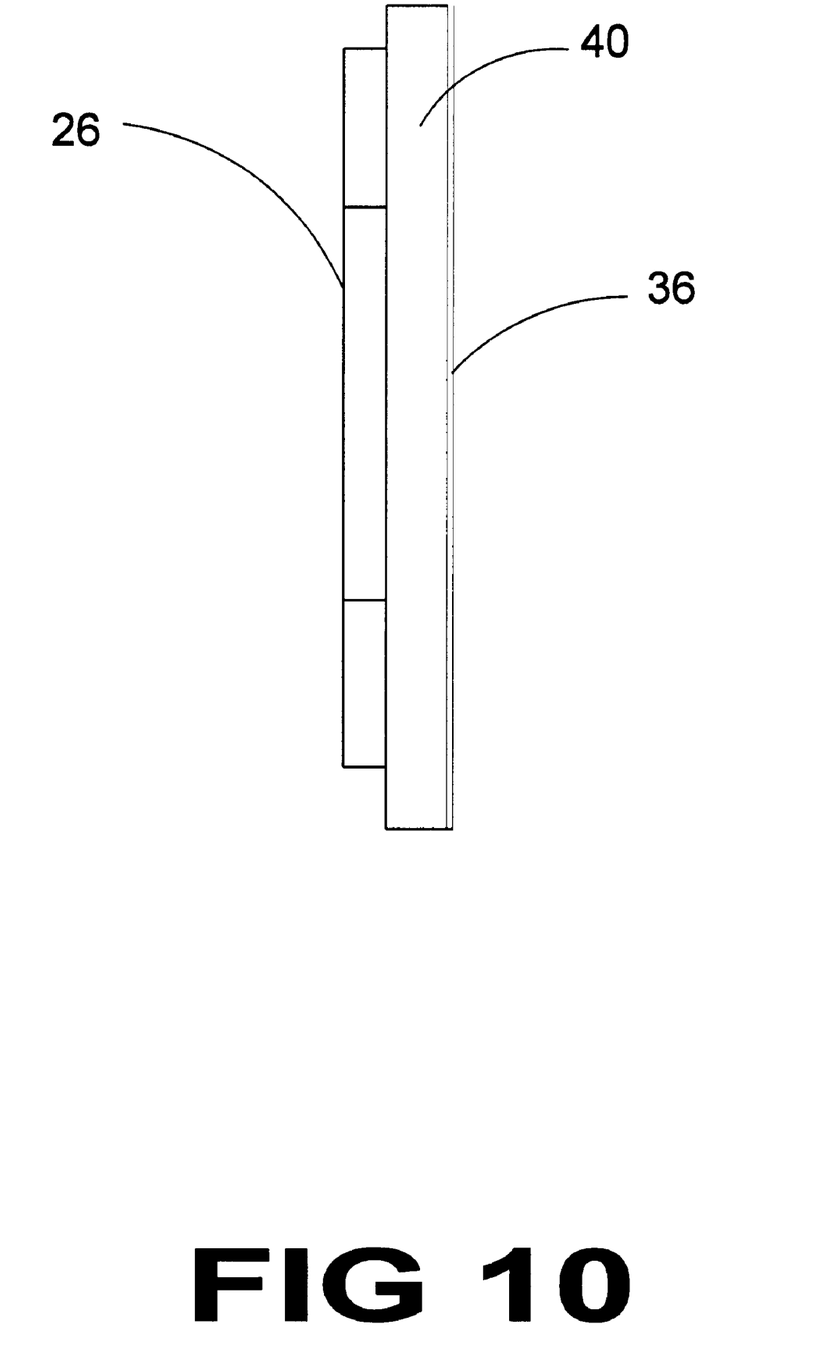
FIG. 10 is a side view of the present invention showing additional elements attached to the exterior surface of the present invention.

Turning to FIG. 10, shown therein is a side view taken from FIG. 9 as indicated. Shown is the alternate embodiment decorative layered design 40 and raised layer 26 as it relates to the adhesive bonding element 36. Also shown is the gauge relation between the decorative design 40 and the raised surface layer 26 of one of the alternate embodiments of the decorative wall and ceiling device.

Figure 11:
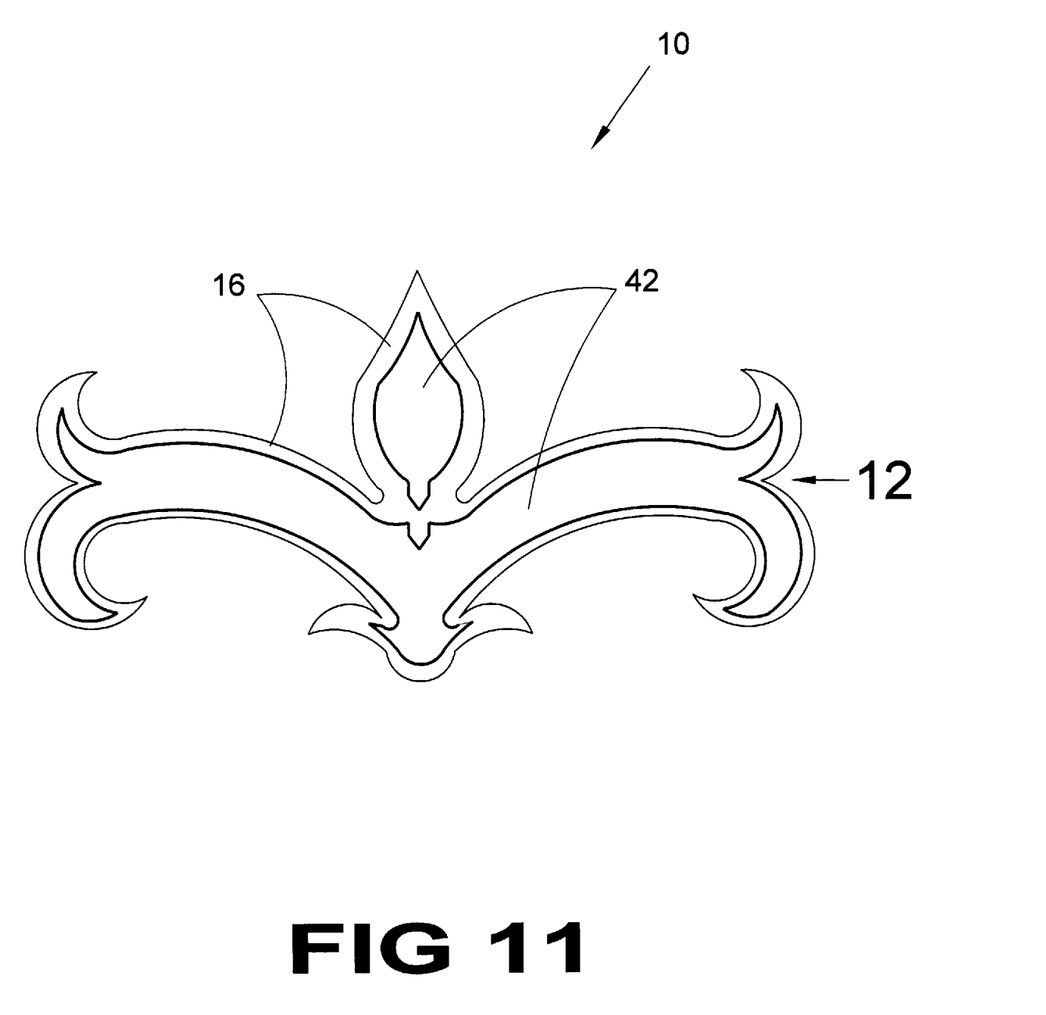
FIG. 11 is a front view of the present invention showing centrally disposed portions removed therefrom.

Turning to FIG. 11, shown therein is a front view, showing an alternate embodiment having a decorative design thereon. Shown also is the alternate embodiment of the decorative wall and ceiling device 10 having a cut out portion 42, extracted from the surface thereof to yield an embroidery design 16.

Figure 12:
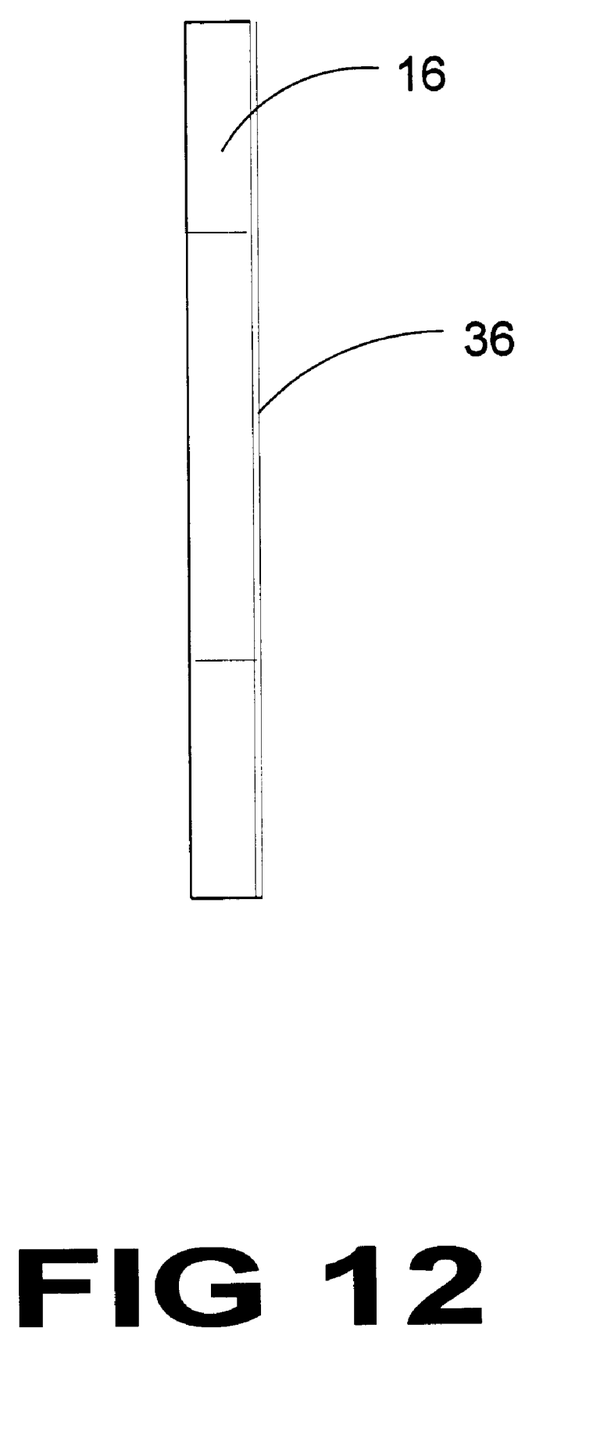
FIG. 12 is a side view of the present invention, taken from FIG. 11 as indicated.

Turning to FIG. 12, shown therein is a side view taken from FIG. 11 as indicated. Shown is an alternate embroidery design 16 layer as it relates to the adhesive bonding element 36. Also shown is the gauge relation between the embroidery design 16 layer as it relates to the adhesive bonding element 36 of one of the alternate embodiments of the decorative wall and ceiling device.

Figure 13:
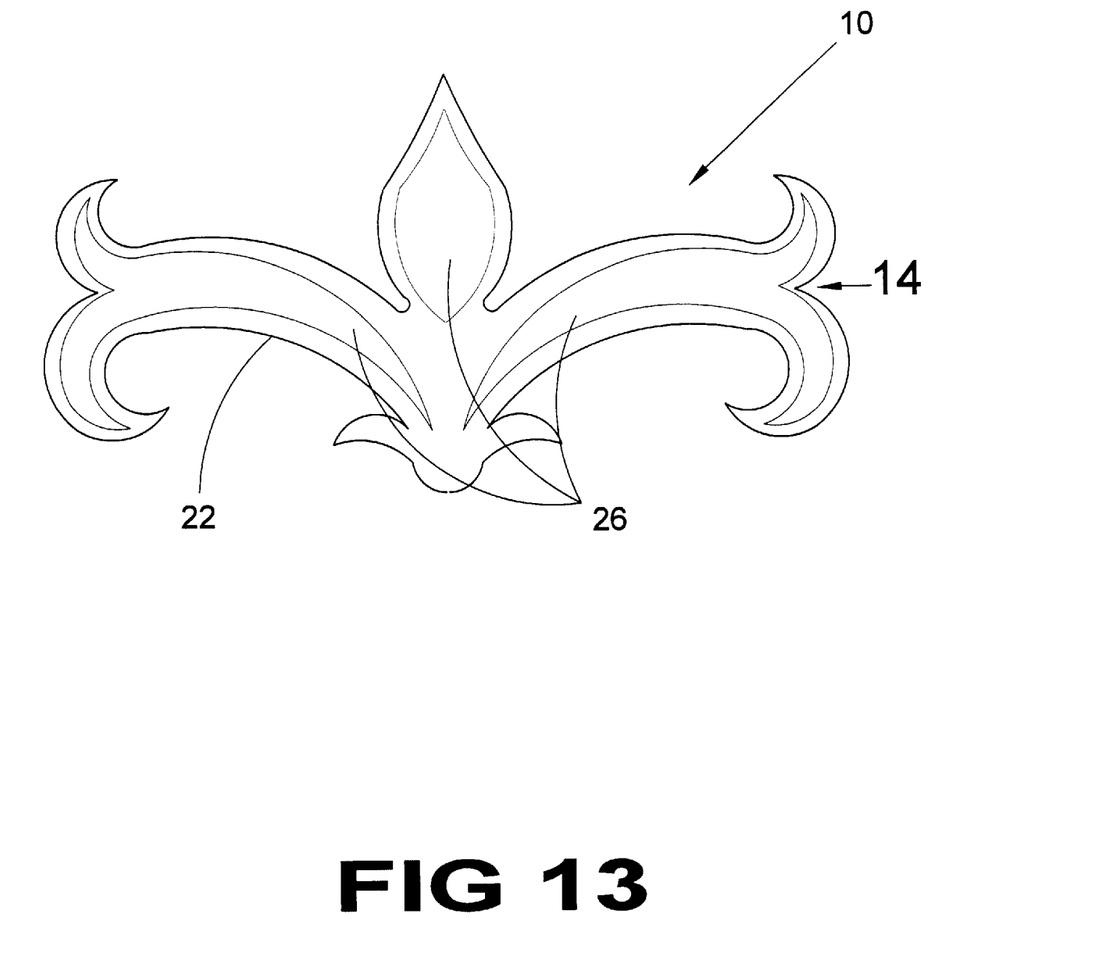
FIG. 13 is a front view of the present invention showing additional elements adhesively fixed to the present invention.

Turning to FIG. 13, shown therein is a front view showing an alternate embodiment having a decorative design thereon. Shown also is the alternate embodiment of the decorative wall and ceiling device 10 having a plurality of selectively attachable pieces 26 selectively attached onto the flat surface 22 thereto.

Figure 14:
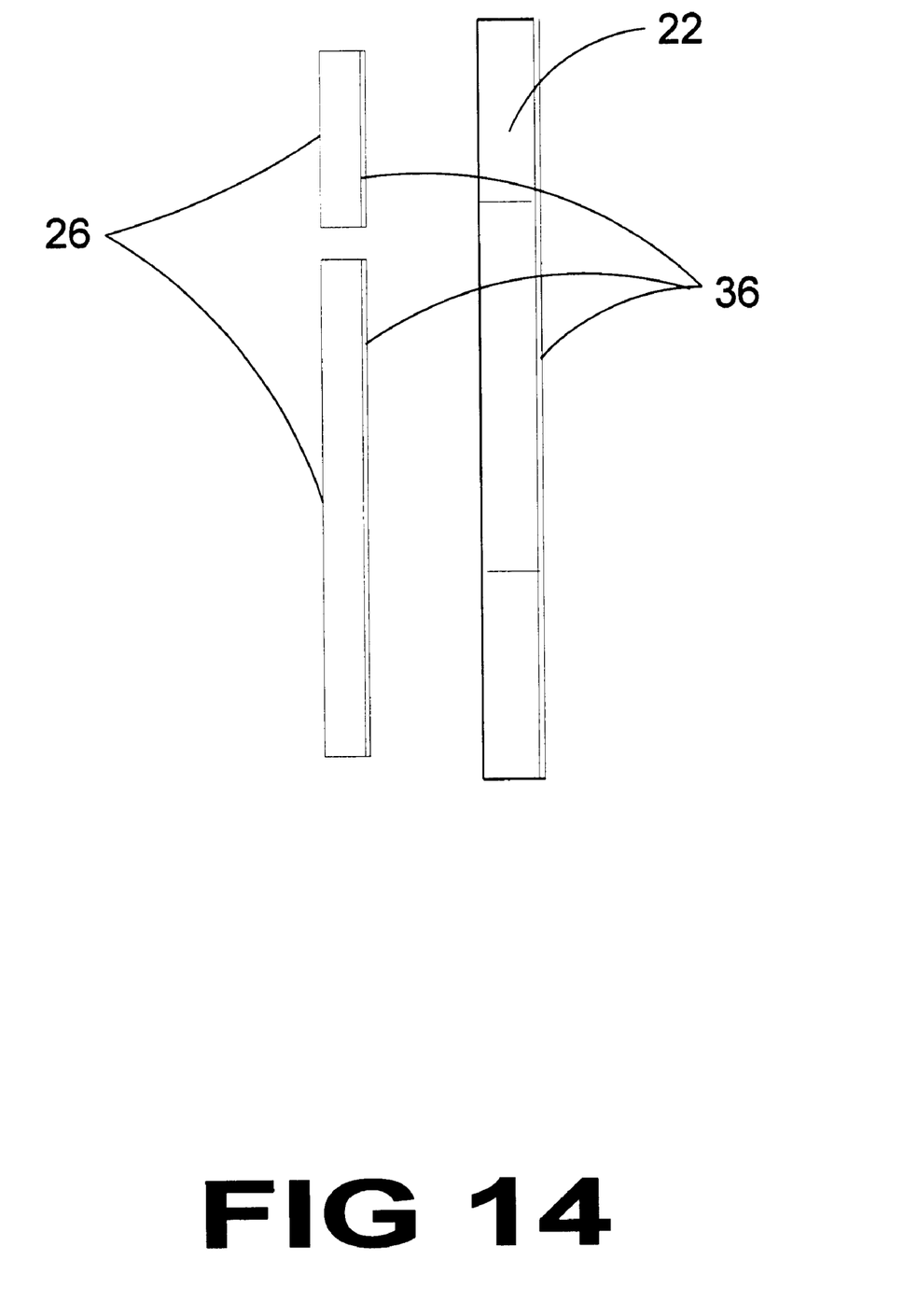
FIG. 14 is a side view of the present invention taken from FIG. 13.

Turning to FIG. 14, shown therein is a side view, taken from FIG. 13 as indicated. Shown is the flat design 22 with the extra attachable pieces 26 and adhesive layer 36.

Figure 15:
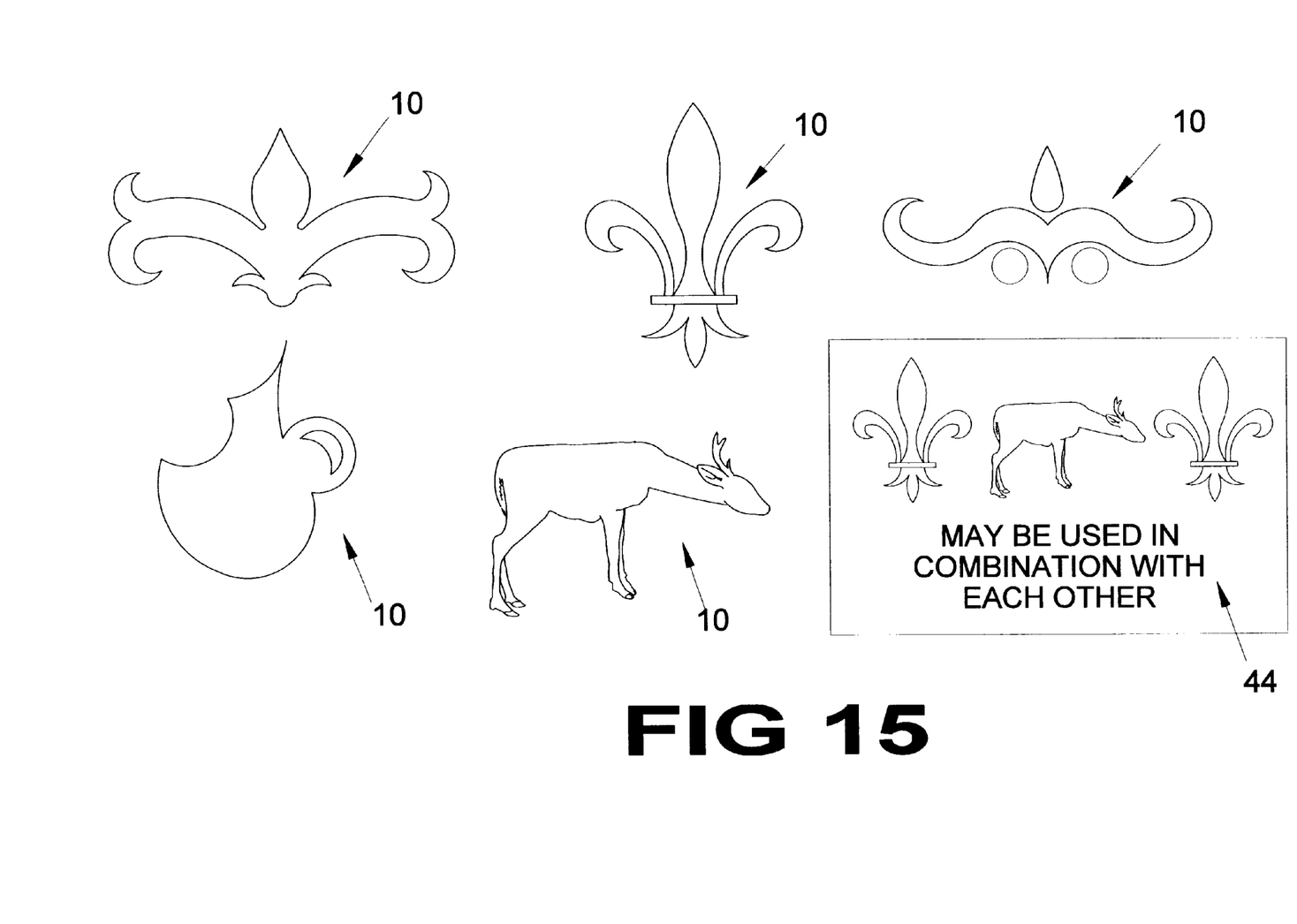
FIG. 15 is an illustrative view of various configurations.

Turning to FIG. 15, shown therein is an illustrative view of various configurations of the present invention 10 which may be used in combination with each other.

What is claimed to be new and desired to be protected by letters patent is set forth in the appended claims.

I claim:

1. A wall and ceiling decoration system, comprising:
   a) a plurality of cross-linked polyethylene foam members, each member being generally planar having a front side and a back side;
   b) an adhesive layer disposed on said back side of each member and an ornamental designed surface with an architectural relief on said front side;
   c) a peel-off backing disposed on said adhesive layer for removal from said adhesive layer;
   d) said adhesive layer for mounting said members directly on a wall to produce a desired decoration;
   e) said members formed in a spatial arrangement of a particular pattern depicting a shape comprising a headboard mounted directly on a wall.

* * * * *